(12) United States Patent
Guo et al.

(10) Patent No.: US 9,728,111 B2
(45) Date of Patent: Aug. 8, 2017

(54) DISPLAY DRIVE METHOD AND APPARATUS, AND METHOD AND APPARATUS FOR GENERATING SAMPLING REGION

(71) Applicants: Boe Technology Group Co., Ltd., Beijing (CN); Beijing Boe Optoelectronics Technology Co., Ltd., Beijing (CN)

(72) Inventors: Renwei Guo, Beijing (CN); Xue Dong, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 85 days.

(21) Appl. No.: 14/904,723

(22) PCT Filed: Jul. 15, 2015

(86) PCT No.: PCT/CN2015/084086
§ 371 (c)(1),
(2) Date: Jan. 13, 2016

(87) PCT Pub. No.: WO2016/138714
PCT Pub. Date: Sep. 9, 2016

(65) Prior Publication Data
US 2016/0379533 A1 Dec. 29, 2016

(30) Foreign Application Priority Data
Mar. 2, 2015 (CN) .......................... 2015 1 0093135

(51) Int. Cl.
*G09G 5/00* (2006.01)
*G09G 3/00* (2006.01)
*G09G 3/20* (2006.01)

(52) U.S. Cl.
CPC ............... *G09G 3/003* (2013.01); *G09G 3/20* (2013.01); *G09G 3/2003* (2013.01);
(Continued)

(58) Field of Classification Search
CPC ........ G09G 3/003; G09G 3/20; G09G 3/2003; G09G 3/2092
(Continued)

(56) References Cited

U.S. PATENT DOCUMENTS

2008/0191966 A1* 8/2008 Van Berkel ....... G02F 1/133514
345/84
2010/0118045 A1* 5/2010 Brown Elliott ........ G09G 3/003
345/589

(Continued)

FOREIGN PATENT DOCUMENTS

CN 103777393 5/2014
CN 104036700 9/2014
(Continued)

OTHER PUBLICATIONS

Office action from Chinese Application No. 201510093135.1 dated May 4, 2016.
(Continued)

*Primary Examiner* — Adam J Snyder
(74) *Attorney, Agent, or Firm* — Calfee, Halter & Griswold LLP

(57) ABSTRACT

The present disclosure provides a display drive method for driving a 3D display device. The method comprises: dividing a first view and a second view to be displayed into a plurality of theoretical pixel units, respectively, and deter-
(Continued)

mining a respective gray value corresponding to a color of each type of subpixels in original display information corresponding to each theoretical pixel unit; and for each subpixel of each view, determining brightness of the subpixel based on respective gray values corresponding to the color of the subpixel in the original display information corresponding to respective theoretical pixel units which are covered by a rectangular sampling region of the subpixel and belong to the view. The present disclosure further provides a display drive apparatus and a method and apparatus for generating a sampling region.

8 Claims, 11 Drawing Sheets

(52) U.S. Cl.
CPC ......... *G09G 3/2074* (2013.01); *G09G 3/2092* (2013.01); *G09G 2300/0404* (2013.01); *G09G 2300/0439* (2013.01); *G09G 2310/0294* (2013.01); *G09G 2320/02* (2013.01); *G09G 2360/147* (2013.01)

(58) Field of Classification Search
USPC ............................................................ 345/6
See application file for complete search history.

(56) References Cited

U.S. PATENT DOCUMENTS

| | | | |
|---|---|---|---|
| 2012/0223941 A1* | 9/2012 | Sekine | H04N 13/0422 345/589 |
| 2013/0058572 A1 | 3/2013 | Kao et al. | |
| 2013/0215360 A1 | 8/2013 | Pollack et al. | |

FOREIGN PATENT DOCUMENTS

| | | |
|---|---|---|
| CN | 104299561 | 1/2015 |
| CN | 104599626 | 5/2015 |

OTHER PUBLICATIONS

International Search Report and Written Opinion from PCT/CN2015/084086 dated Nov. 12, 2015.

* cited by examiner

DISPLAY DRIVE METHOD AND APPARATUS, AND METHOD AND APPARATUS FOR GENERATING SAMPLING REGION

CROSS-REFERENCE TO THE RELATED APPLICATIONS

The present application is the U.S. national phase entry of PCT/CN2015/084086, with an international filing date of Jul. 15, 2015, which claims the benefit of Chinese Patent Application No. 201510093135.1, filed on Mar. 2, 2015, the entire disclosures of which are incorporated herein by reference.

TECHNICAL FIELD

The present disclosure relates to the field of display technologies, and particularly to a display drive method and apparatus and a method and apparatus for generating a sampling region.

BACKGROUND

In a conventional liquid crystal display device or organic light-emitting diode display device, each pixel displays color by using a plurality of subpixels for light mixing. For example, each pixel may comprise one red subpixel, one green subpixel and one blue subpixel. To improve a visual effect, increasingly high requirements have been posed to a resolution of a display device and thus subpixels are required that are smaller and smaller in size; however, the size of the subpixels cannot be reduced infinitely due to process limitations. To improve the display effect with subpixels having certain sizes, a display device working in a Pentile mode is proposed in the prior art, wherein images to be displayed are divided into a plurality of theoretical pixel units according to the resolution of a screen, and each subpixel is provided with a sampling region. The brightness of the subpixel is determined based on overlap of the sampling region and the theoretical pixel units and a gray value corresponding to the color of the subpixel in original information corresponding to respective theoretical pixel units. In such a display device, a part of the subpixels are "shared" so as to achieve a resolution higher than an actual resolution in terms of the visual effect.

In a 2D display device, subpixels of each color are distributed uniformly. When the 2D display device is driven virtually, the sampling region corresponding to each subpixel is of the same shape, and the position of the sampling region corresponding to each subpixel relative to the subpixel is also the same. In a 3D display device with an irregular grating, subpixels of the same color corresponding to the same view are not distributed uniformly. Application of the virtual drive method for the 2D display device to the 3D display device with the irregular grating will cause overlapped sampling or failure to sample completely, thereby resulting in distortion of the displayed images.

SUMMARY

It is an object of the present disclosure to provide a display drive method adapted for a 3D display device with an irregular grating, to avoid distortion of images caused by overlapped sampling or failure to sample completely.

According to a first aspect of the present disclosure, there is provided a display drive method for driving a 3D display device. The 3D display device comprises a pixel array and a grating array, the pixel array comprising a first view pixel group and a second view pixel group, the first view pixel group and second view pixel group being arranged alternately in both a row direction and a column direction, each view pixel group including M*N subpixels arranged in one column, where N represents a number of types of subpixel colors and M is an integer greater than or equal to 3. The grating array shields a first side of the first view pixel group and a second side of the second view pixel group in the column direction, the first side and the second side being two opposite sides. The method comprises dividing a first view and a second view to be displayed into a plurality of theoretical pixel units, respectively, and determining a respective gray value corresponding to a color of each type of subpixels in original display information corresponding to each theoretical pixel unit; and for each subpixel of each view, determining brightness of the subpixel based on respective gray values corresponding to the color of the subpixel in the original display information corresponding to respective theoretical pixel units which are covered by a rectangular sampling region of the subpixel and belong to the view, wherein a midpoint of a connection line between a center of each subpixel and a center of each of respective neighboring subpixels of the same type is located on a boundary of the rectangular sampling region of the subpixel, subpixels being of the same type as one subpixel referring to the subpixels which belong to the same view and are in the same color as the subpixel.

Further, N may have a value of 3, and the pixel array may be a delta pixel array.

Further, a length of each subpixel in the row direction may be twice that in the column direction, and each theoretical pixel unit may correspond to two neighboring subpixels in the column direction.

Further, the determining the brightness of the subpixel may comprise: for each subpixel, determining a respective area of overlap between its rectangular sampling region and each of a plurality of theoretical pixel units covered by the sampling region; determining a respective product of the respective area of overlap corresponding to each theoretical pixel unit and the gray value corresponding to the color of the subpixel in the original display information corresponding to the theoretical pixel unit; and determining the brightness of the subpixel based on an area of the rectangular sampling region and a sum of respective products.

According to a second aspect of the present disclosure, there is provided a method of generating a rectangular sampling region for each subpixel in the display drive method as recited in the first aspect, comprising dividing the pixel array into a plurality of array units, each array unit comprising a total of four neighboring pixel groups in two rows and two columns; for each subpixel in any of the array units, determining a midpoint of a connection line between a center of the subpixel and a center of each of respective neighboring subpixels of the same type; generating the rectangular sampling region of the subpixel such that the midpoint of each connection line is located on a boundary of the rectangular sampling region; and generating rectangular sampling regions for corresponding subpixels in other array units in a manner in which the rectangular sampling region of the subpixel in any of the array units is generated.

According to a third aspect of the present disclosure, there is provided a display drive apparatus for driving a 3D display device. The 3D display device comprises a pixel array and a grating array, the pixel array comprising a first view pixel group and a second view pixel group, the first view pixel group and second view pixel group being arranged alternately in both a row direction and a column direction, each view pixel group including M*N subpixels arranged in one column, where N represents a number of types of subpixel colors and M is an integer greater than or equal to 3. The grating array shields a first side of the first view pixel group and a second side of the second view pixel group in the column direction, the first side and the second side being two opposite sides. The display drive apparatus comprises a pixel dividing unit configured to divide a first view and a second view to be displayed into a plurality of theoretical pixel units, respectively, and to determine a respective gray value corresponding to a color of each type of subpixels in original display information corresponding to each theoretical pixel unit; and a brightness determining unit configured to, for each subpixel of each view, determine brightness of the subpixel based on respective gray values corresponding to the color of the subpixel in the original display information corresponding to respective theoretical pixel units which are covered by a rectangular sampling region of the subpixel and belong to the view, wherein a midpoint of a connection line between a center of each subpixel and a center of each of respective neighboring subpixels of the same type is located on a boundary of the rectangular sampling region of the subpixel, subpixels being of the same type as one subpixel referring to the subpixels which belong to the same view and are in the same color as the subpixel.

Further, N may have a value of 3, and the pixel array may be a delta pixel array.

Further, a length of each subpixel in the row direction may be twice that in the column direction, and each theoretical pixel unit may correspond to two neighboring subpixels in the column direction.

Further, the brightness determining unit is configured to: for each subpixel, determine a respective area of overlap between its rectangular sampling region and each of a plurality of theoretical pixel units covered by the sampling region; determine a respective product of the respective area of overlap corresponding to each theoretical pixel unit and the gray value corresponding to the color of the subpixel in the original display information corresponding to the theoretical pixel unit; and determine the brightness of the subpixel based on an area of the rectangular sampling region and a sum of respective products.

According to a fourth aspect of the present disclosure, there is provided an apparatus for generating a rectangular sampling region for each subpixel in the display drive apparatus as recited in the third aspect, comprising an array unit dividing module configured to divide the pixel array into a plurality of array units, each array unit comprising a total of four neighboring pixel groups in two rows and two columns; a sampling region generating module configured to: for each subpixel in any of the array units, determine a midpoint of a connection line between a center of the subpixel and a center of each of respective neighboring subpixels of the same type; generate a rectangular sampling region for the subpixel such that the midpoint of each connection line is located on a boundary of the rectangular sampling region; and generate rectangular sampling regions for corresponding subpixels in other array units in a manner in which the rectangular sampling region of the subpixel in any of the array units is generated.

In the display drive method according to embodiments of the present disclosure, a midpoint of a connection line between a center of each subpixel and a center of each of respective neighboring subpixels of the same type is located on a boundary of the rectangular sampling region of the subpixel, and subpixels being of the same type as one subpixel refer to the subpixels which belong to the same view and are in the same color as the subpixel. As such, complete sampling of the whole display area as well as absence of overlapped sampling is achieved, and thereby distortion of images is avoided caused by incomplete sampling or overlapped sampling.

BRIEF DESCRIPTION OF THE DRAWINGS

FIG. 1 is a schematic view of a possible pixel array of a 3D display device to which a display drive method according to an embodiment of the present disclosure is applied;

FIG. 2 is a schematic view showing distribution of a possible grating array corresponding to the pixel array of FIG. 1;

FIG. 5 is a schematic view showing distribution of red subpixels in a left eye view;

FIG. 6 shows a sampling region of blue subpixels of row R4 and column S5;

FIG. 7 shows theoretical pixel units covered by the sampling region of blue subpixels of row R4 and column S5;

FIG. 8 shows a sampling region of blue subpixels of row R7 and column S5;

FIG. 11 shows theoretical pixel units covered by the sampling region of blue subpixels of row C12 and column S4;

FIG. 12 shows a sampling region of blue subpixels of row C15 and column S4;

FIG. 17 shows one array unit among the pixel arrays;

DETAILED DESCRIPTION

Figure 3:
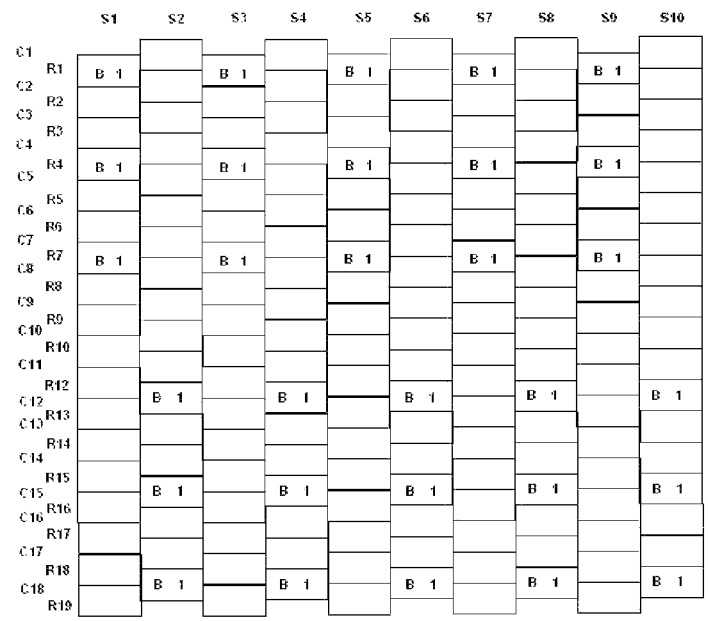
FIG. 3 is a schematic view showing distribution of blue subpixels in a left eye view.

To make objects, technical solutions, and advantages of embodiments of the present disclosure more clear, technical solutions in embodiments of the present disclosure will be described below clearly and completely in conjunction with figures in embodiments of the present disclosure. Obviously, embodiments described here are only a part of embodiments of the present disclosure, and not all of the embodiments. All other embodiments conceived, on the basis of embodiments of the present disclosure, by those having ordinary skill in the art without making any inventive effort, fall within the protection scope of the present disclosure.

A display drive method according to an embodiment of the present disclosure may be used to drive a 3D display device which may comprise a pixel array and a grating array.

Figures 1, 2:
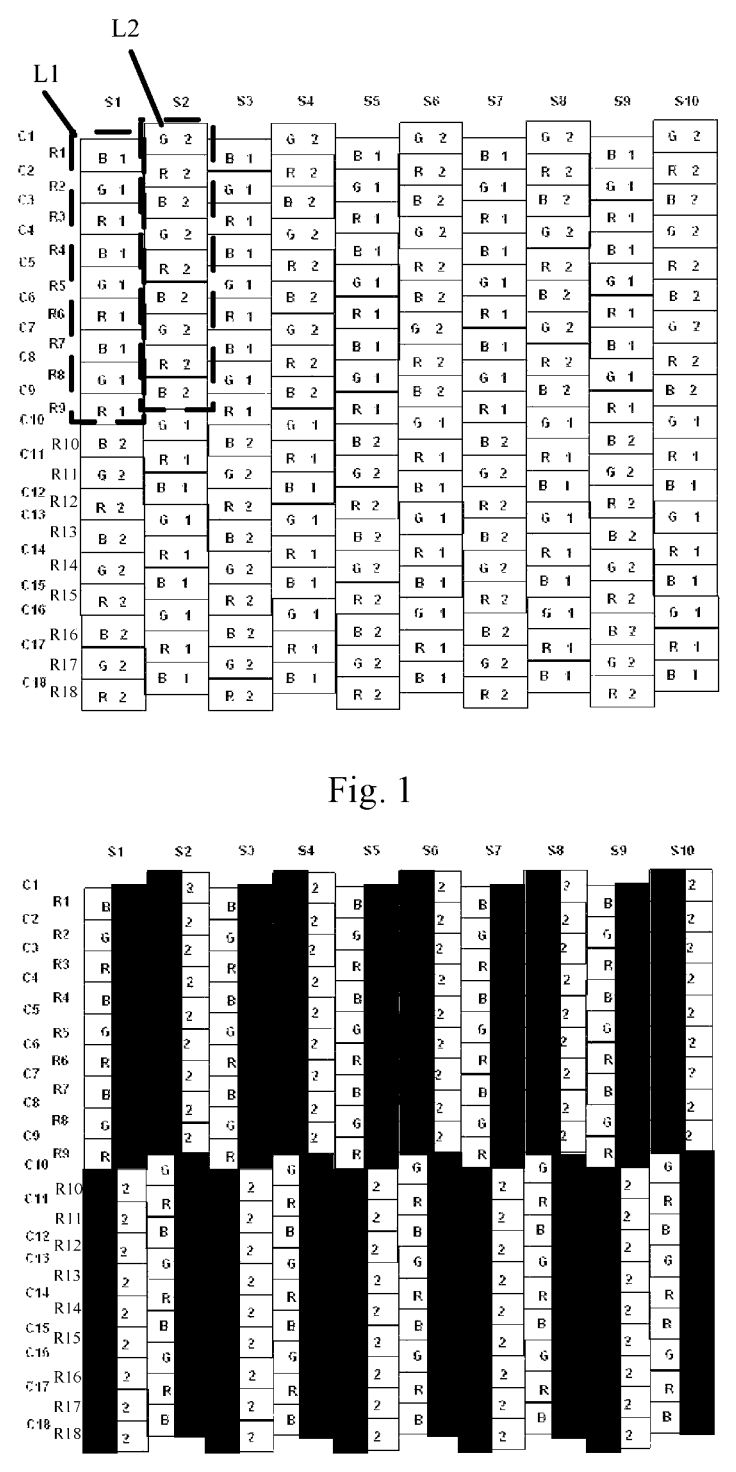

FIG. 1 is a schematic view of a possible pixel array of a 3D display device to which the display drive method according to an embodiment of the present disclosure is applied. The pixel array comprises a first view pixel group and a second view pixel group. The first view pixel group and second view pixel group are arranged alternately in both a row direction and a column direction, each view pixel group including M*N subpixels arranged in one column, where N represents a number of types of subpixel colors and M is an integer greater than or equal to 3. In an example shown in FIG. 1, the pixel array has 18 rows (namely, R1-R18 or C1-C18) and 10 columns (namely, S1-S10) of subpixels. The pixel array comprises a left-eye view pixel group L1 and a right-eye view pixel group L2 which are arranged alternately in both the row direction and the column direction. The left-eye view pixel group L1 and right-eye view pixel group L2 both include 9 rectangular subpixels arranged in one column. As counted from up to down, the first, fourth and seventh subpixels of the left-eye view pixel group L1 are blue subpixels B1, the second, fifth and eighth subpixels are green subpixels G1, and the third, sixth and ninth subpixels are red subpixels R1. Similarly, the first, fourth and seventh subpixels of the right-eye view pixel group L2 are green subpixels G2, the second, fifth and eighth subpixels are red subpixels R2, and the third, sixth and ninth subpixels are blue subpixels B2. In this example, the first subpixel B1 of the left-eye view pixel group L1 is half a subpixel lower in the column direction than the first subpixel G2 of the right-eye view pixel group L2. As such, the centers of any two neighboring subpixels in the column direction (e.g., the first subpixel B1 and the second subpixel G1 of L1) and the center of a subpixel (corresponding to the second subpixel R2 of L2) which is, in a neighboring column, closest to the two subpixels and colored different from both of the two subpixels, form an isosceles triangle. Such pixel arrangement that a shape formed by centers of closest subpixels of different colors is a triangle is called a delta (Δ) pixel array. Moreover, in this example, a length of each subpixel in the row direction is twice that in the column direction so that two neighboring subpixels in the column direction form a square which corresponds to a theoretical pixel unit.

FIG. 2 is a schematic view showing distribution of a grating array. The grating array shields a first side of the first view pixel group and a second side of the second view pixel group in the column direction, and the first side and the second side are two opposite sides. In an example shown in FIG. 2, the grating array (the black portion in the figure) shields the right side of the pixel group L1 as well as the left side of the pixel group L2. Referring to FIG. 2, since gratings in the grating array are distributed differently in different regions, such grating array becomes an irregular grating. Light exiting out of the pixel group L1 can only be spread to the left and seen by the left eye, and light exiting out of the pixel group L2 can only be spread to the right and seen by the right eye.

In this case, with the pixel group L1 and pixel group L2 being controlled, the left eye and the right eye are enabled to see different images so that 3D display is achieved.

The sampling region of subpixels in embodiments of the present disclosure is described below in combination with FIGS. 3-16.

Figure 4:
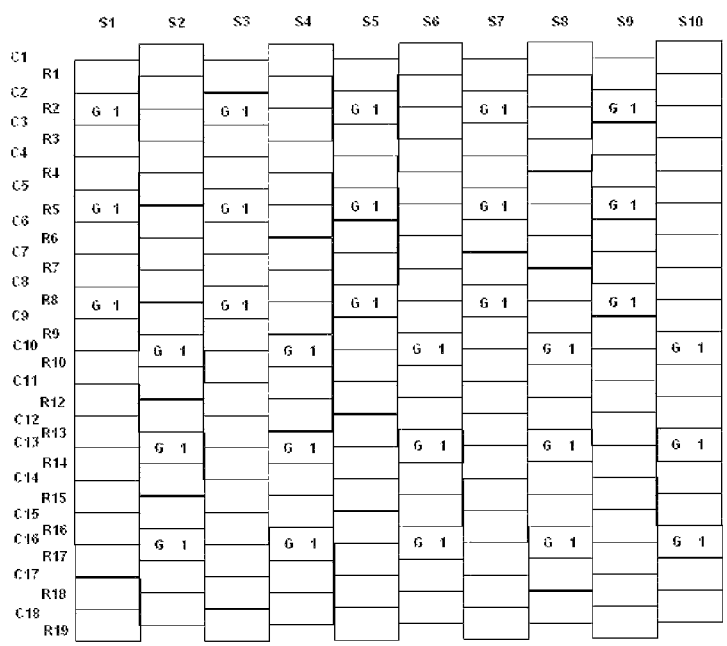
FIG. 4 is a schematic view showing distribution of green subpixels in a left eye view.

For ease of depiction, the sampling regions corresponding to the subpixels of the left-eye view are described in detail. FIG. 3, FIG. 4 and FIG. individually show a distribution chart of subpixels of each color in the left-eye view, wherein FIG. 3 shows a distribution chart of blue subpixels B1 in the left-eye view, FIG. 4 shows a distribution chart of green subpixels G1 in the left-eye view, and FIG. 5 shows a distribution chart of red subpixels R1 in the left-eye view.

Figures 5, 6:
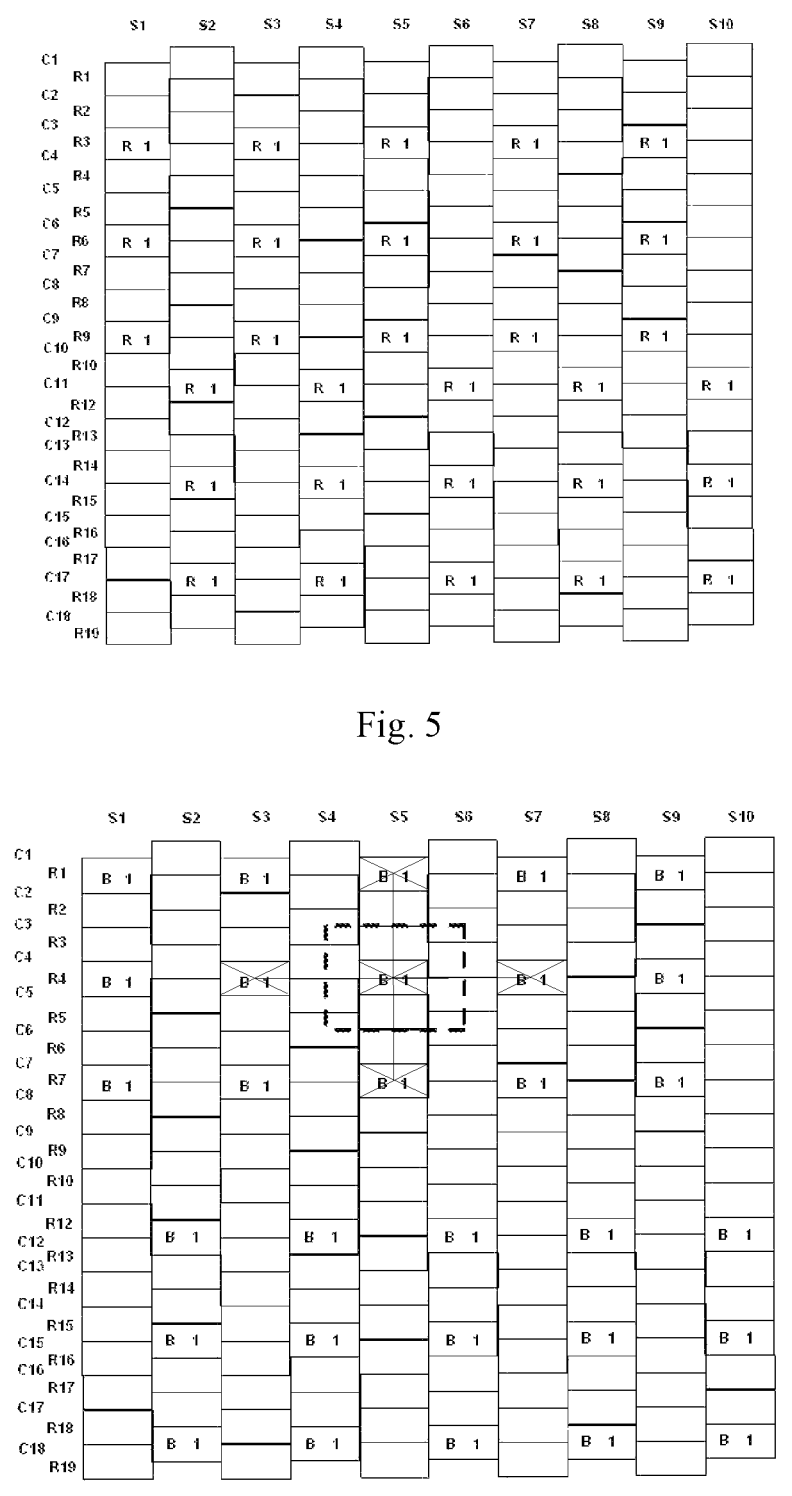
Figures 7, 8:
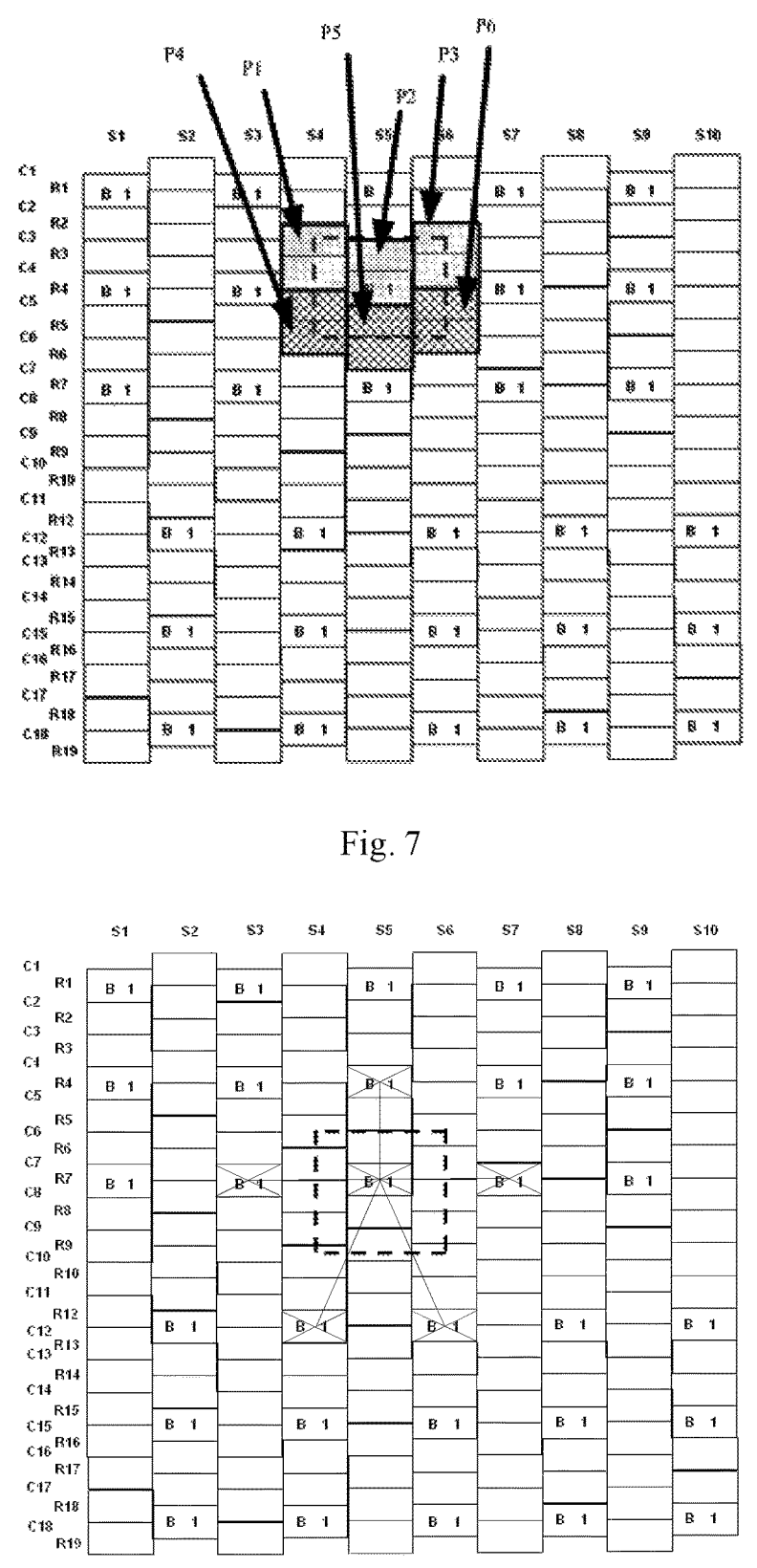

In the case of blue subpixels, as shown in FIG. 6, for the blue subpixel B1 of row R4 and column S5, subpixels which are of the same type and closest thereto are four blue subpixels B1 located, respectively, at row R4 and column S3, row R4 and column S7, row R1 and column S5, and row R7 and column S5, and a rectangular sampling region thereof may be indicated by a dotted line box in FIG. 6 or FIG. 7. That is, an upper side of the rectangular sampling region is located at a boundary of row R2 and row R3, so that a midpoint of a connection line between a center of the blue subpixel B1 of row R4 and column S5 and a center of an upper blue subpixel B1 of row R1 and column S5 is located on the upper side of the rectangular sampling region. Similarly, a lower side of the rectangular sampling region is located at a boundary of row R5 and row R6, so that a midpoint of a connection line between a center of the blue subpixel B1 of row R4 and column S5 and a center of a lower blue subpixel B1 of row R7 and column S5 is located on the lower side of the rectangular sampling region; a left side of the rectangular sampling region is located at a center line of column S4, so that a midpoint of a connection line between a center of the blue subpixel B1 of row R4 and column S5 and a center of a left blue subpixel B1 of row R4 and column S3 is located on the left side of the rectangular sampling region; a right side of the rectangular sampling region is located at a center line of column S6, so that a midpoint of a connection line between a center of the blue subpixel B1 of row R4 and column S5 and a center of a right blue subpixel B1 of row R4 and column S7 is located on the right side of the rectangular sampling region.

In this case, as shown in FIG. 7, a length of the rectangular sampling region of the blue subpixel B1 of row R4 and column S5 in the row direction is twice a length of one subpixel in the row direction, and a length of the rectangular sampling region in the column direction is three times a length of one subpixel in the column direction, such that the rectangular sampling region covers a total of six theoretical pixel units (P1-P6). Particularly, an area of overlap between the rectangular sampling region and each of theoretical pixel units P1, P3, P4 and P6 occupies ⅜ of one theoretical pixel unit, with the theoretical pixel unit P2 totally falling within the rectangular sampling region and ½ of the theoretical pixel unit P5 falling within the rectangular sampling region.

For the blue subpixel B1 of row R7 and column S5, subpixels of the same type closest thereto in three directions, namely, up, left and right, are blue subpixels B1 located, respectively, at row R4 and column S5, row R7 and column S3, and row R7 and column S7. Subpixels of the same type which are lower and closest to the blue subpixel B1 of row R7 and column S5, are blue subpixels B1 of row C12 and column S4, and of row C12 and column S6. In this case, the rectangular sampling region of the subpixel of row R7 and column S5 is as shown in FIG. 8, wherein an upper side of the rectangular sampling region is located at a boundary of row R5 and row R6, so that a midpoint of a connection line between a center of the blue subpixel B1 of row R7 and column S5 and a center of the upper blue subpixel B1 of row R4 and column S5 is located on the upper side of the rectangular sampling region. A lower side of the rectangular sampling region is located at ¼ from top of the subpixel of row C10, so that a midpoint of a connection line between the center of the blue subpixel B1 of row R7 and column S5 and a center of the row R12 and column S4, and a midpoint of a connection line between the center of the blue subpixel B1 of row R7 and column S5 and a center of the blue subpixel B1 of row R12 and column S6, both located on the lower side of the rectangular sampling region. A left side of the rectangular sampling region is located at a center line of column S4, so that a midpoint of a connection line between a center of the blue subpixel B1 of row R7 and column S5 and a center of a left blue subpixel B1 of row R7 and column S3 is located on the left side of the rectangular sampling region. A right side of the rectangular sampling region is located at a center line of column S6, so that a midpoint of a connection line between a center of the blue subpixel B1 of row R7 and column S5 and a center of a right blue subpixel B1 of row R7 and column S7 is located on the right side of the rectangular sampling region.

Figure 9:
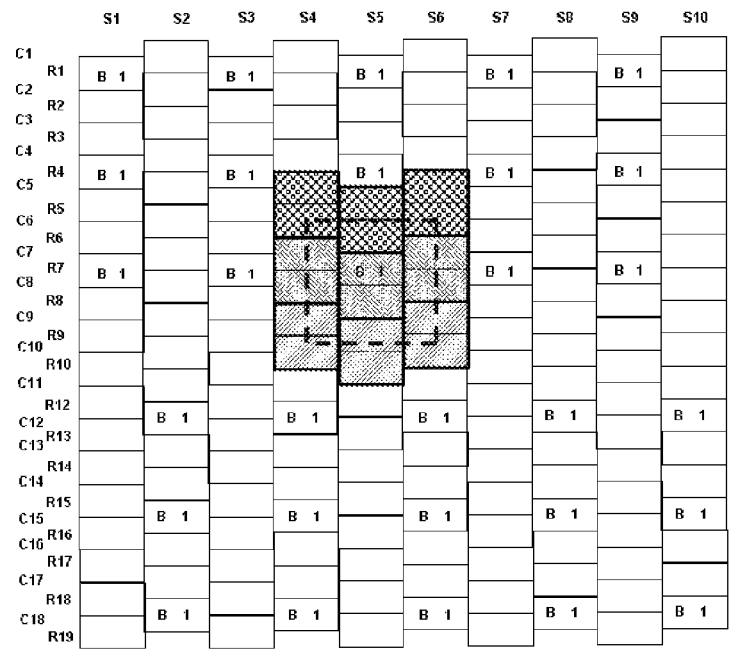
FIG. 9 shows theoretical pixel units covered by the sampling region of blue subpixels of row R7 and column S5.

As shown in FIG. 9, a length of the rectangular sampling region of the blue subpixel B1 of row R7 and column S5 in the row direction is twice a length of one subpixel in the row direction, and a length of the rectangular sampling region in the column direction is 15/4 times a length of one subpixel in the column direction. The rectangular sampling region of row R7 and column S5 covers a total of nine theoretical pixel units.

Figure 10:
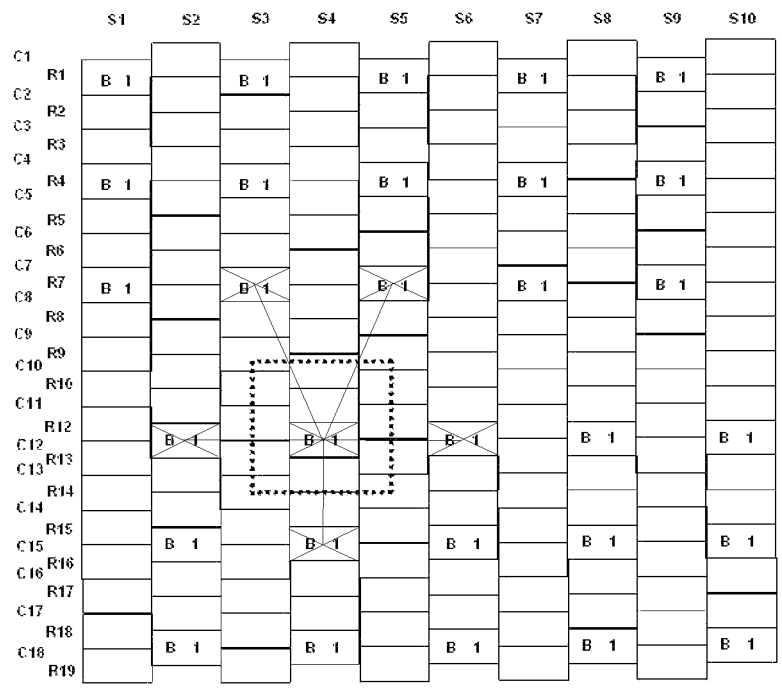
FIG. 10 shows a sampling region of blue subpixels of row C12 and column S4.

Now referring to FIG. 10, for the blue subpixel B1 of row C12 and column S4, an upper side of the rectangular sampling region thereof is located at ¼ from top of the subpixel of row C10, and flushes with the lower side of the rectangular sampling region of the blue subpixel B1 of row R7 and column S5. A lower side of the rectangular sampling region is located at a boundary of the subpixel of row C13 and the subpixel of row C14, and a left side and a right side are located, respectively, at a center line of the subpixels of column S3 and the subpixels of column S5.

Figures 11, 12:
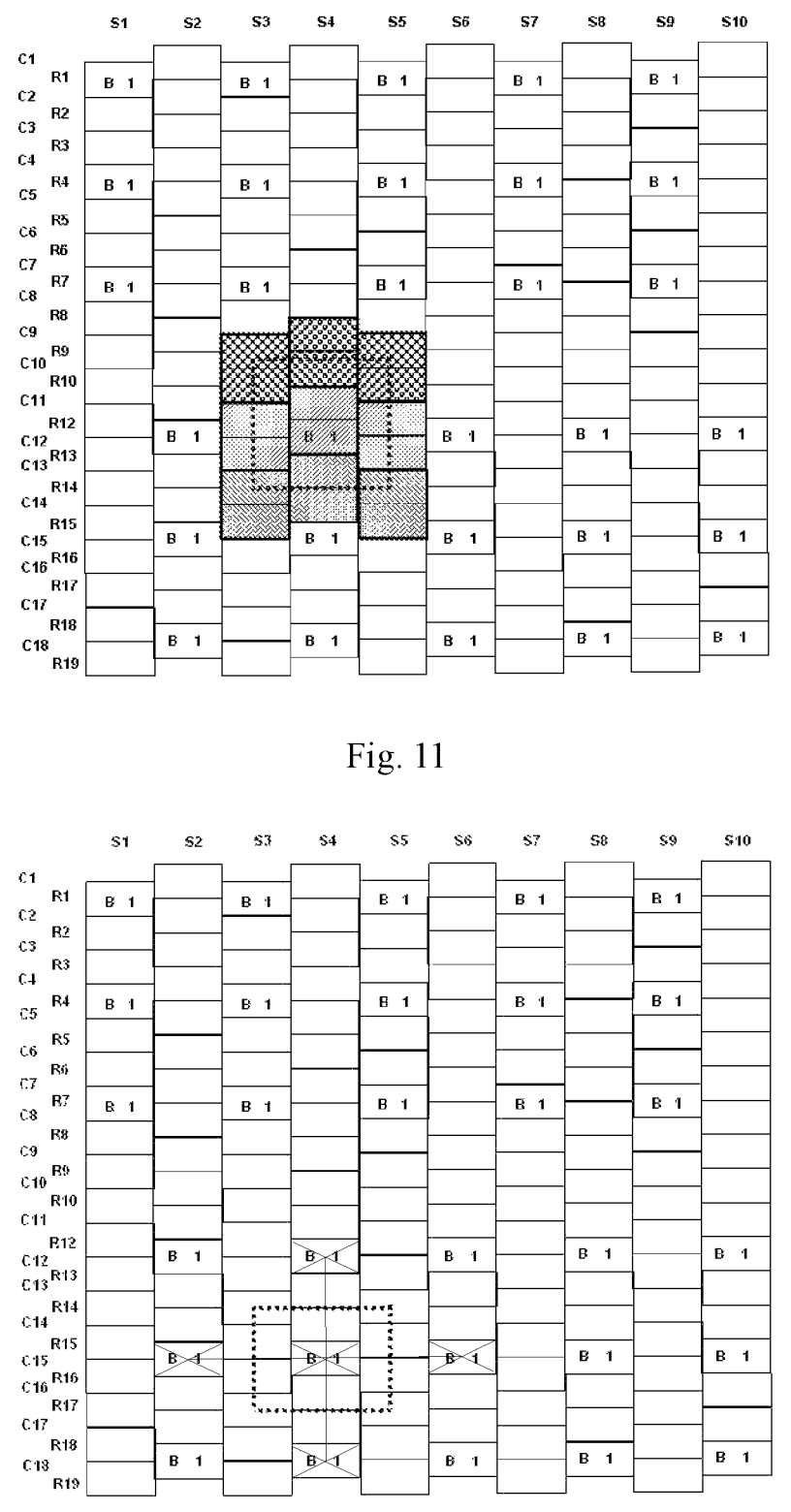

As shown in FIG. 11, a length of the rectangular sampling region of the blue subpixel B1 of row C12 and column S4 in the row direction is twice a length of one subpixel in the row direction, and a length of the rectangular sampling region in the column direction is 15/4 times one length of a subpixel in the column direction. The rectangular sampling region of the blue subpixel B1 of row C12 and column S4 covers a total of nine theoretical pixel units.

Figure 13:
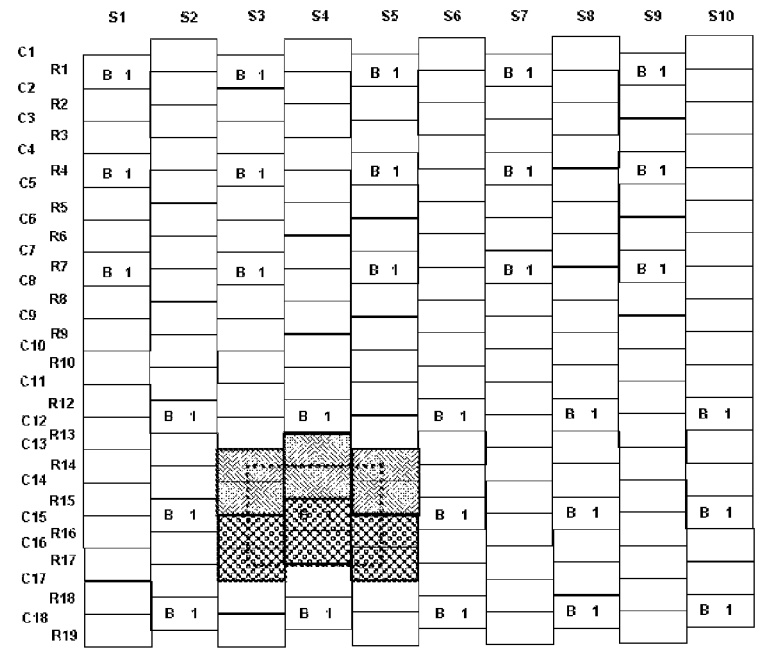
FIG. 13 shows theoretical pixel units covered by the sampling region of blue subpixels of row C15 and column S4.

Referring to FIG. 12, for the blue subpixel B1 of row C15 and columns S4, an upper side of the rectangular sampling region thereof is located at boundary of the subpixel of row C13 and the subpixel of row C14; a lower side of the rectangular sampling region is located at a boundary of the subpixels of row C16 and the subpixels of row C17, and a left side and a right side are located, respectively, at a center line of the subpixels of column S3 and the subpixels of column S5. The size of the rectangular sampling region of the subpixel and the position of the rectangular sampling region relative to the subpixel both accord with the blue subpixel B1 of row R4 and column S5. Similarly, as shown in FIG. 13, the rectangular sampling region of the blue subpixel B1 of row C15 and column S4 covers a total of six theoretical pixel units.

Figure 14:
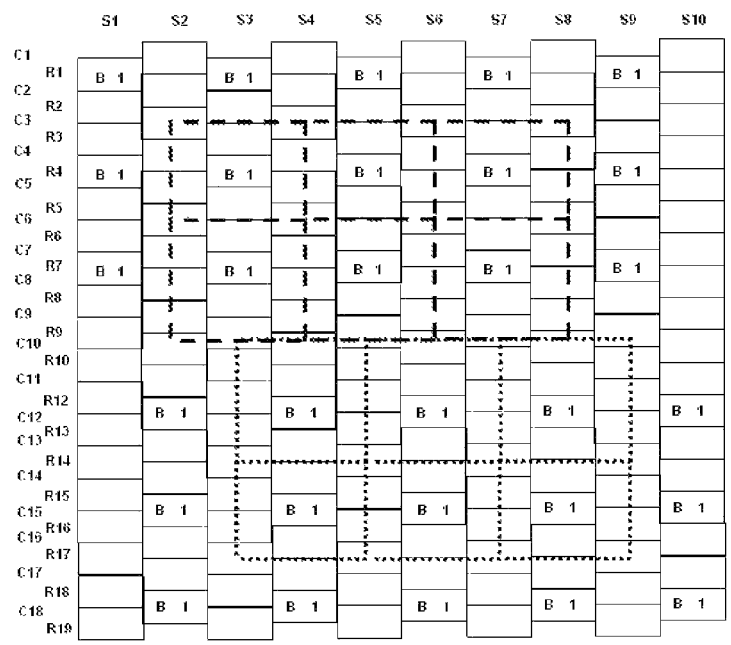
FIG. 14 shows a sampling region of a plurality of blue subpixels in a left eye view.

FIG. 14 shows a plurality of sampling regions of blue subpixels B1 in the left-eye view. In different areas of the pixel array, sizes and shapes of the rectangular sampling regions of the blue subpixels are not all identical. However, since the sampling regions of two neighboring blue subpixels equally divide an area therebetween, it can be ensured that all areas of the whole view are sampled and will not be sampled repeatedly so that the displayed 3D display images are more vivid.

Figure 15:
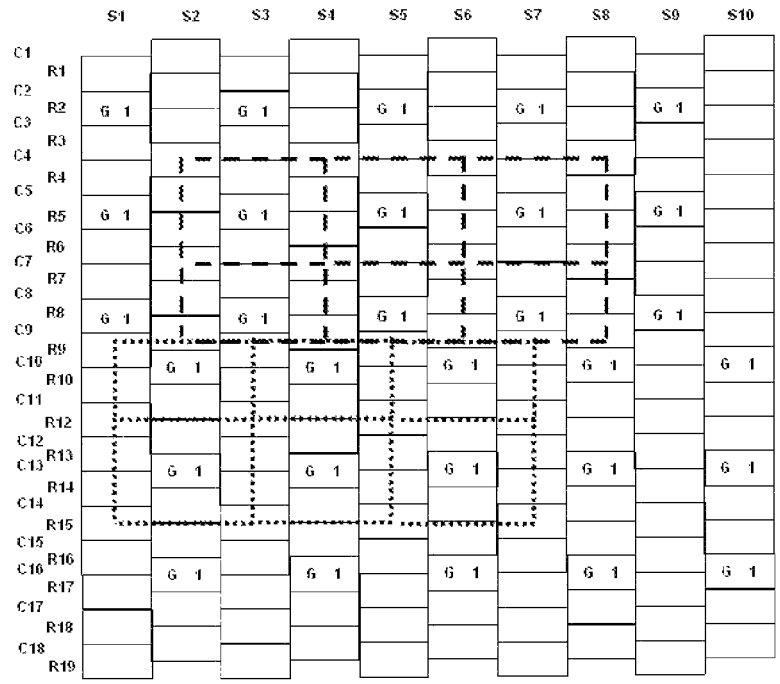
FIG. 15 shows a sampling region of a plurality of green subpixels in a left eye view.
Figure 16:
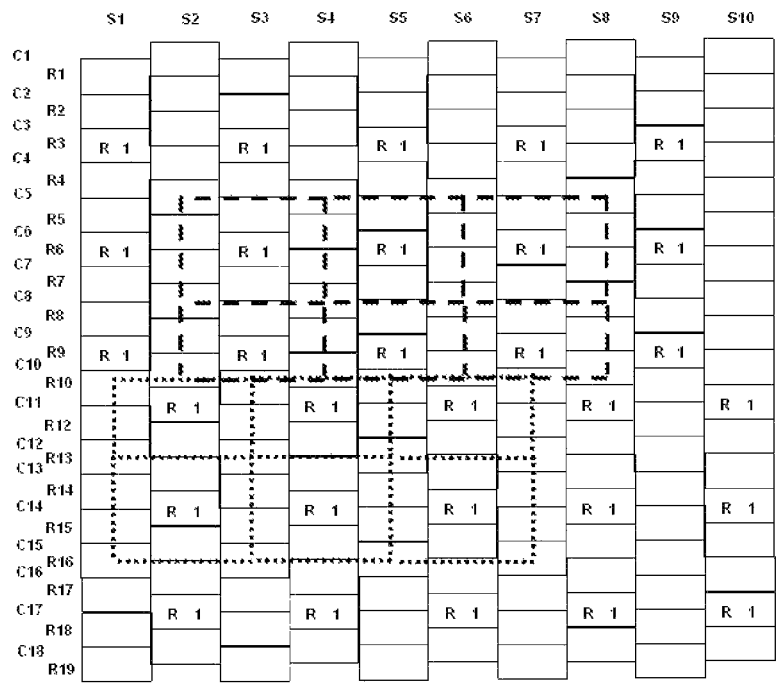
FIG. 16 shows a sampling region of a plurality of red subpixels in a left eye view.

Similarly, FIG. 15 shows a plurality of sampling regions of green subpixels G1 in the left-eye view, and FIG. 16 shows a plurality of sampling regions of red subpixels R1 in the left-eye view.

Figure 18A:
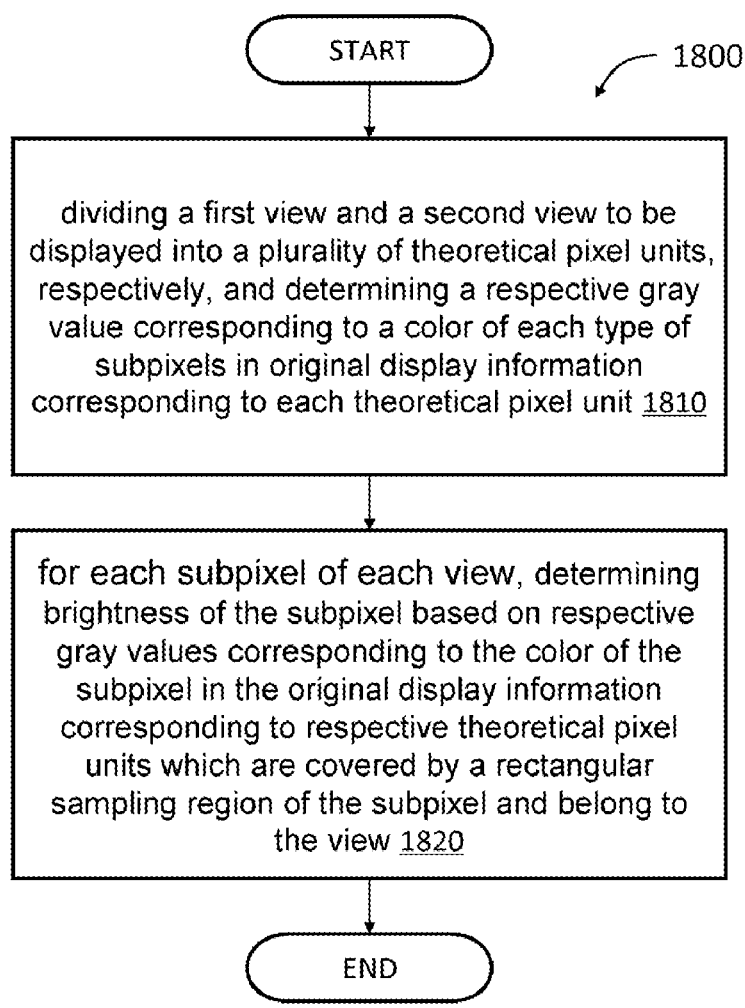
FIGS. 18A and 18B are flow charts of a display drive method for driving a 3D display device according to an embodiment of the present disclosure.

As is shown in FIG. 18A, according to a first aspect of the present disclosure, there is provided a display drive method 1800 for driving a 3D display device which comprises the above-mentioned pixel array and grating array. The method 1800 may comprise the following steps.

At step 1800, the left-eye view and right-eye view to be displayed are divided into a plurality of theoretical pixel units, respectively, and a respective gray value corresponding to a color (e.g., red, green, or blue) of each type of subpixels in original display information corresponding to each theoretical pixel unit is determined.

Specifically, a pixel in the display device may correspond to a theoretical pixel unit. Therefore, the left-eye view may be divided into a plurality of theoretical pixel units according to the number of pixels that can be theoretically reached by the 3D display device. Then, determination is performed for the gray values corresponding to the colors of red, green and blue in the original display information corresponding to each theoretical pixel unit. In the same manner, a plurality of theoretical pixel units corresponding to the right-eye view and gray values corresponding to the colors of red, green and blue in the original display information corresponding to each theoretical pixel unit, can be obtained.

At step 1820, for each subpixel of each view, brightness of the subpixel is determined based on respective gray values corresponding to the color of the subpixel in the original display information corresponding to respective theoretical pixel units which are covered by the rectangular sampling region of the subpixel and belong to the view.

The rectangular sampling region may be defined as follows: a midpoint of a connection line between a center of each subpixel and a center of each of respective neighboring subpixels of the same type is located on a boundary of the rectangular sampling region of the subpixel, wherein subpixels being of the same type as one subpixel refer to the subpixels which belong to the same view and are in the same color as the subpixel.

Figure 18B:
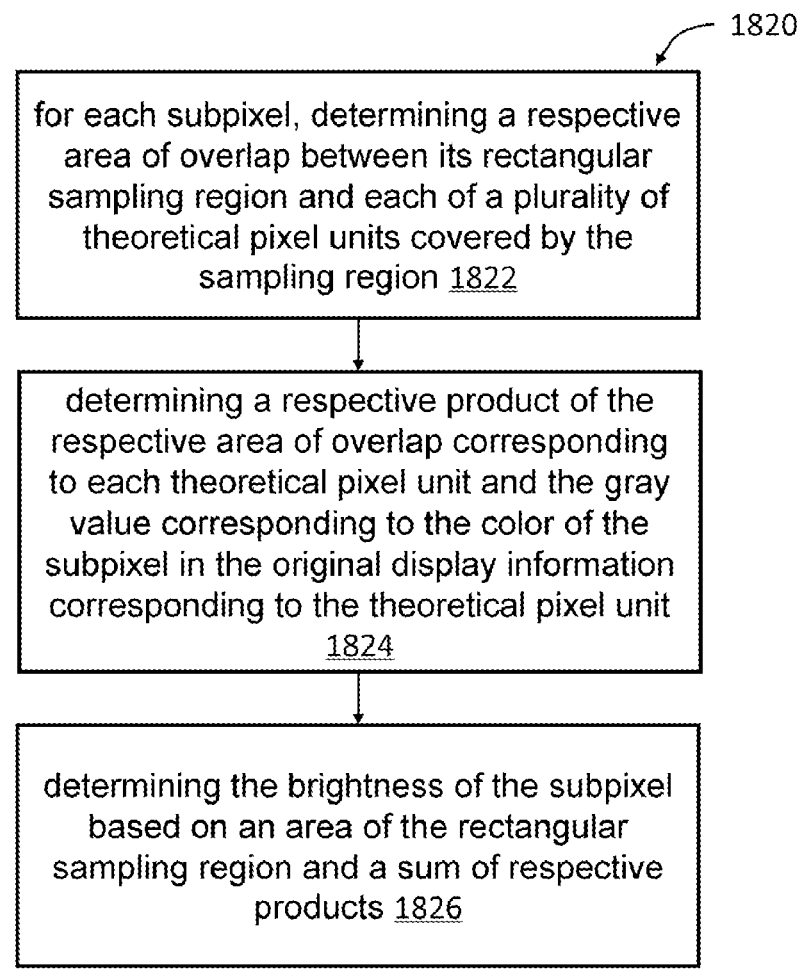

As is shown in FIG. 18B, step 1820 may specifically comprise:

for each subpixel (e.g., the subpixel B1 of row R4 and column S5 as shown in FIG. 6, hereinafter referred to as subpixel B1), determining at step 1822 a respective area of overlap between its rectangular sampling region and each of a plurality of theoretical pixel units (e.g., P1, P2, . . . P6 as shown in FIG. 7) covered by the sampling region;

determining at step 1824 a respective product of the respective area of overlap corresponding to each theoretical pixel unit (P1, P2, . . . P6) and the gray value corresponding to the color (namely, blue B) of the subpixel in the original display information corresponding to the theoretical pixel unit; and determining at step 1826 the brightness of the subpixel (subpixel B1) based on an area of the rectangular sampling region and a sum of respective products. More specifically, the brightness of the subpixel may be obtained by dividing the sum of respective products by the area of the rectangular sampling region.

The resultant brightness is a weighted sum of the gray values corresponding to the color of the subpixel in the original display information corresponding to respective theoretical pixel units covered by the rectangular sampling region, wherein a weight is a proportion of the rectangular sampling region accounted for by an overlapping area of the rectangular sampling region and a respective one of the theoretical pixel units covered by the sampling region.

It should be appreciated that in practical applications, after sampling is performed using the rectangular sampling region, the brightness of the subpixel may be determined in other manners, which will not be described in detail here.

It should be noted that when the number M is 2, each subpixel is the first subpixel or last subpixel in the corresponding color in the subpixel group to which it belongs, and that when M is 1, each subpixel is the first subpixel and last subpixel in the corresponding color in the subpixel group to which it belongs. As such, neighboring subpixels of the same type are distributed completely consistently for each subpixel. In this case, according to a conventional design scheme, making the size and shape of the sampling region of each subpixel consistent may achieve complete and unrepeated sampling of the display area. Although this conventional design scheme may objectively cause a midpoint of a connection line between the center of each subpixel and the center of each of respective neighboring subpixels of the same type to be located at the boundary of the rectangular sampling region of the subpixel, it is to be understood that the idea of such a conventional design scheme still lies in making the size and shape of the sampling region of each subpixel consistent, rather than making a midpoint of a connection line between the center of each subpixel and the center of each of respective neighboring subpixels of the same type to be located at the boundary of the rectangular sampling region of the subpixel as set forth in the present disclosure. Since distributions of the subpixels addressed by the two schemes are completely different, it should not be considered that the present disclosure is a simple converted use of the conventional design scheme.

It is further to be noted that although an embodiment with subpixels in three colors has been described, in practical applications, the display drive method according to embodiments of the present disclosure may also be applied to drive other types of 3D display devices having an irregular grating, such as a 3D display device with four kinds of colors. These applications fall within the protection scope of the present disclosure as well.

Additionally, it is appreciated that in the 3D display device, a length of each subpixel in the row direction is not necessarily twice a length of the subpixel in the column direction. For instance, when there are four kinds of colors of subpixels, each subpixel may be a square, with four subpixels forming a theoretical pixel unit.

As stated above, use of the display drive method according to embodiments of the present disclosure enables complete sampling for the whole display area as well as absence of sampling overlapping, thereby avoiding distortion of images caused by incomplete sampling or overlapped sampling.

According to a second aspect of the present disclosure, a method is provided for generating a rectangular sampling region for each subpixel. The method may comprise the following steps:

dividing the pixel array into a plurality of array units, each array unit comprising a total of four neighboring pixel groups in two rows and two columns;

for each subpixel in any of the array units, determining a midpoint of a connection line between a center of the subpixel and a center of each of respective neighboring subpixels of the same type;

generating a rectangular sampling region for the subpixel such that the midpoint of each connection line is located on a boundary of the rectangular sampling region; and generating rectangular sampling regions for corresponding subpixels in other array units in a manner in which the rectangular sampling region of the subpixel in any of the array units is generated.

Figure 17:
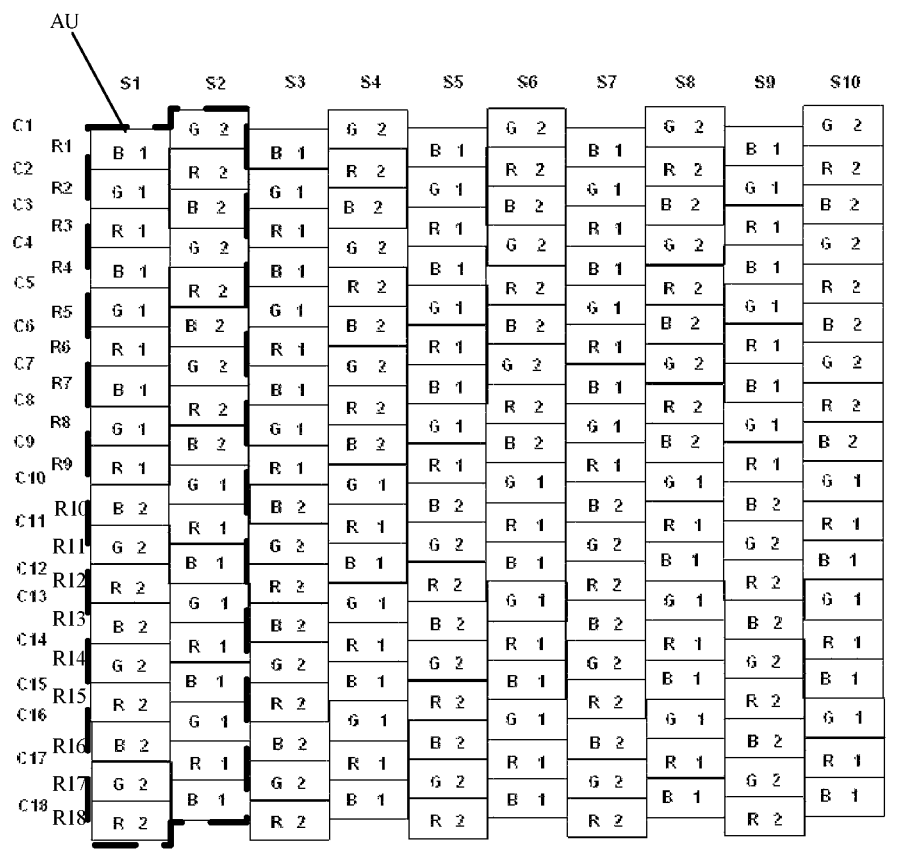

For the pixel array as shown in FIG. 1, an array unit AU may be selected firstly, which comprises a total of four neighboring pixel groups, namely, two left-eye view pixel groups L1 (namely, subpixels in column S1 and rows R1-R9 and subpixels in column S2 and rows C10-C18) and two right-eye view pixel groups (namely, subpixels in column S1 and rows R10-R18 and subpixels in column S2 and rows C1-C9), as shown in FIG. 17. After the rectangular sampling region is generated for each subpixel in this array unit, a rectangular sampling region of a counterpart subpixel at a corresponding location in other array units may be generated according to the size of the rectangular sampling region of each subpixel and a position thereof relative to the subpixel. As such, a workload of generating sampling regions can be substantially reduced, and resource consumption be lowered.

Figure 19:
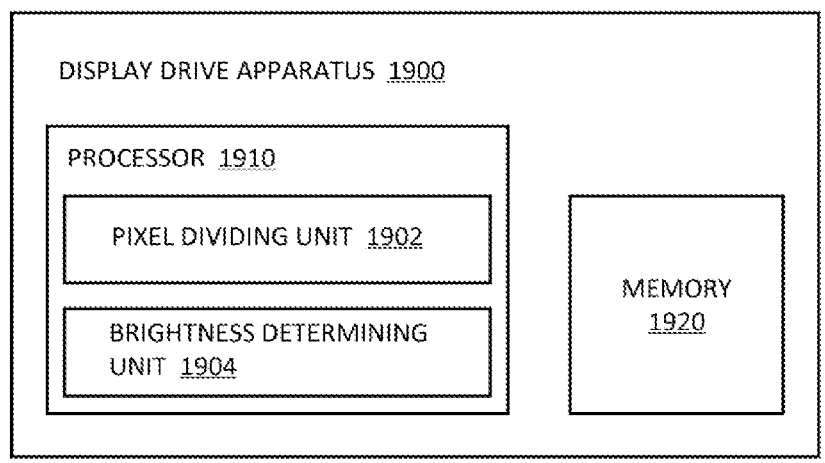
FIG. 19 is a schematic diagram of a display drive apparatus for driving a 3D display device according to an embodiment of the present disclosure.

As is shown in FIG. 19, according to a third aspect of the present disclosure, there is provided a display drive apparatus 1900 for implementing the above display drive method to drive a 3D display device. The 3D display device comprises a pixel array and a grating array. The pixel array comprises a first view pixel group and a second view pixel group, wherein the first view pixel group and second view pixel group are arranged alternately in both a row direction and a column direction, each view pixel group including M*N subpixels arranged in one column, where N represents a number of types of subpixel colors and M is an integer greater than or equal to 3. The grating array shields a first side of the first view pixel group and a second side of the second view pixel group in the column direction, and the first side and the second side are two opposite sides.

The display drive apparatus 1900 comprises:

a pixel dividing unit 1902 configured to divide the first view and second view to be displayed into a plurality of theoretical pixel units, respectively, and determine a respective gray value corresponding to a color of each type of subpixels in original display information corresponding to each theoretical pixel unit;

a brightness determining unit 1904 configured to, for each subpixel of each view, determine brightness of the subpixel based on respective gray values corresponding to the color of the subpixel in the original display information corresponding to respective theoretical pixel units which are covered by a rectangular sampling region of the subpixel and belong to the view;

wherein a midpoint of a connection line between a center of each subpixel and a center of each of respective neighboring subpixels of the same type is located on a boundary of the rectangular sampling region of the subpixel, subpixels being of the same type as one subpixel referring to the subpixels which belong to the same view and are in the same color as the subpixel.

The pixel dividing unit 1902 and the brightness determining unit 1904 may be implemented as electronic hardware, computer software or a combination thereof. For example, these two units may be implemented using a generalpurpose processor, a digital signal processor (DSP), an application-specific integrated circuit (ASIC), a field programmable gate array (FPGA) or another programmable logical device, discrete gate or transistor logics, or discrete hardware components in combination with a necessary control program. In an example, the pixel dividing unit 1902 and the brightness determining unit 1904 are implemented as a digital signal processor (DSP) 1910, and a gray value corresponding to each color (e.g., red, green, or blue) in the original display information corresponding to each theoretical pixel unit may be stored in a memory 1920. The pixel dividing unit 1902 retrieves a gray value from the memory 1920 and provides it to the brightness determining unit 1904, which then uses the gray value to complete calculation of the brightness of the subpixel.

Further, the brightness determining unit is configured to: for each subpixel, determine a respective area of overlap between its rectangular sampling region and each of a plurality of theoretical pixel units covered by the sampling region, to determine a respective product of the respective area of overlap corresponding to each theoretical pixel unit and the gray value corresponding to the color of the subpixel in the original display information corresponding to the theoretical pixel unit, and to determine the brightness of the subpixel based on an area of the rectangular sampling region and a sum of respective products. More specifically, the brightness of the subpixel may be obtained by dividing the sum of respective products by the area of the rectangular sampling region.

Further, N has a value of 3, and the pixel array is a delta pixel array.

Further, a length of each subpixel in the row direction is twice that in the column direction, and each theoretical pixel unit corresponds to two neighboring subpixels in the column direction.

According to a fourth aspect of the present disclosure, there is provided a sampling region generating apparatus for generating a sampling region of each subpixel in the display drive apparatus according to any of the above aspects.

The apparatus comprises an array unit dividing module configured to divide the pixel array into a plurality of array units, each array unit comprising a total of four neighboring pixel groups in two rows and two columns; and a sampling region generating module configured to, for each subpixel in any of the array units, determine a midpoint of a connection line between a center of the subpixel and a center of each of respective neighboring subpixels of the same type, to generate a rectangular sampling region for the subpixel such that the midpoint of each connection line is located on a boundary of the rectangular sampling region, and to generate rectangular sampling regions for corresponding subpixels in other array units in a manner in which the rectangular sampling region of the subpixel in any of the array units is generated.

The foregoing is only specific embodiments of the present disclosure; however the protection scope of the present disclosure is not limited thereto. Variations and alternatives that may be readily envisaged by those skilled in the art in a technical scope revealed by the present disclosure should all fall within the protection scope of the present disclosure. Hence, the protection scope of the present disclosure should be defined by the claims.

What is claimed is:

1. A display drive method for driving a 3D display device, the 3D display device comprising: a pixel array and a grating array, the pixel array comprising: a plurality of first view pixel groups; and a plurality of second view pixel groups; wherein the plurality of first view pixel groups and second view pixel groups are arranged alternately in both a row direction and a column direction, wherein each view pixel group includes M*N subpixels arranged in one column, wherein N represents a number of types of subpixel colors and M is an integer greater than or equal to 3 wherein the grating array shields a first side of the first view pixel group and a second side of the second view pixel group in the column direction, and wherein the first side and the second side are two opposite sides, the method comprising:

dividing a first view and a second view to be displayed into a plurality of theoretical pixel units, respectively;

determining a respective gray value corresponding to a color of each type of subpixels in original display information corresponding to each theoretical pixel unit; and for each subpixel of each view, determining brightness of the subpixel based on respective gray values corresponding to the color of the subpixel in the original display information corresponding to respective theoretical pixel units which are covered by a rectangular sampling region of the subpixel and belong to the view, wherein a midpoint of a connection line between a center of each subpixel and a center of each of respective neighboring subpixels of the same type is located on a boundary of the rectangular sampling region of the subpixel, subpixels being of the same type as one subpixel referring to the subpixels which belong to the same view and are in the same color as the subpixel.

2. The method according to claim 1, wherein N has a value of 3, and the pixel array is a delta pixel array.

3. The method according to claim 2, wherein a length of each subpixel in the row direction is twice that in the column direction, and each theoretical pixel unit corresponds to two neighboring subpixels in the column direction.

4. The method according to claim 1, wherein the determining the brightness of the subpixel comprises:

for each subpixel, determining a respective area of overlap between its rectangular sampling region and each of a plurality of theoretical pixel units covered by the sampling region;

determining a respective product of the respective area of overlap corresponding to each theoretical pixel unit and the gray value corresponding to the color of the subpixel in the original display information corresponding to the theoretical pixel unit; and determining the brightness of the subpixel based on an area of the rectangular sampling region and a sum of respective products.

5. A display drive apparatus for driving a 3D display device, the 3D display device comprising a pixel array and a grating array, the pixel array comprising a plurality of first view pixel groups and a plurality of second view pixel groups, the plurality of first view pixel groups and second view pixel groups being arranged alternately in both a row direction and a column direction, each view pixel group including M*N subpixels arranged in one column, where N represents a number of types of subpixel colors and M is an integer greater than or equal to 3, the grating array shielding a first side of the first view pixel group and a second side of the second view pixel group in the column direction, and the first side and the second side being two opposite sides, the display drive apparatus comprising:

a pixel dividing unit implemented by a processor and configured to divide a first view and a second view to be displayed into a plurality of theoretical pixel units, respectively, and determine a respective gray value corresponding to a color of each type of subpixels in original display information corresponding to each theoretical pixel unit; and a brightness determining unit implemented by the processor and configured to, for each subpixel of each view, determine brightness of the subpixel based on respective gray values corresponding to the color of the subpixel in the original display information corresponding to respective theoretical pixel units which are covered by a rectangular sampling region of the subpixel and belong to the view, wherein a midpoint of a connection line between a center of each subpixel and a center of each of respective neighboring subpixels of the same type is located on a boundary of the rectangular sampling region of the subpixel, subpixels being of the same type as one subpixel referring to the subpixels which belong to the same view and are in the same color as the subpixel.

6. The display drive apparatus according to claim 5, wherein N has a value of 3, and the pixel array is a delta pixel array.

7. The display drive apparatus according to claim 6, wherein a length of each subpixel in the row direction is twice that in the column direction, and each theoretical pixel unit corresponds to two neighboring subpixels in the column direction.

8. The display drive apparatus according to claim 6, wherein the brightness determining unit is configured to:

for each subpixel, determine a respective area of overlap between its rectangular sampling region and each of a plurality of theoretical pixel units covered by the sampling region;

determine a respective product of the respective area of overlap corresponding to each theoretical pixel unit and the gray value corresponding to the color of the subpixel in the original display information corresponding to the theoretical pixel unit; and determine the brightness of the subpixel based on an area of the rectangular sampling region and a sum of respective products.

* * * * *